United States Patent [19]

Trammell

[11] Patent Number: 4,568,976
[45] Date of Patent: Feb. 4, 1986

[54] APPARATUS FOR SYNCHRONIZING TWO VIDEO PICTURES BY CONTROLLING VERTICAL SYNCHRONIZATION OF A VIDEO CAMERA

[76] Inventor: Joseph E. Trammell, R.D. 4, Navesink Ave., Atlantic Highlands, N.J. 07716

[21] Appl. No.: 557,091

[22] Filed: Dec. 1, 1983

[51] Int. Cl.$^4$ .............................................. H04N 5/04
[52] U.S. Cl. ................................ 358/148; 358/150; 358/182
[58] Field of Search ............... 358/148, 149, 150, 151, 358/10, 22, 139, 183, 182

[56] References Cited

U.S. PATENT DOCUMENTS

| | | | |
|---|---|---|---|
| 2,808,455 | 10/1957 | Moore | 358/22 |
| 3,368,035 | 2/1968 | Dennison | 358/149 |
| 3,564,141 | 2/1971 | Hurst | 358/148 |
| 3,647,954 | 3/1972 | Booker, Jr. et al. | 358/148 |
| 3,705,262 | 12/1972 | Kennedy et al. | 358/148 |
| 3,761,627 | 9/1973 | Schneider | 358/149 |
| 3,928,720 | 12/1975 | Watatani et al. | 358/148 |
| 3,984,633 | 10/1976 | Rutt et al. | 358/148 |
| 4,203,135 | 5/1980 | Sasaki | 358/149 |
| 4,203,138 | 5/1980 | Elenbaas | 360/37 |
| 4,214,261 | 7/1980 | Bazin et al. | 358/19 |
| 4,218,705 | 8/1980 | Inaba et al. | 358/149 |
| 4,333,103 | 6/1982 | Koiwa et al. | 358/149 |
| 4,340,903 | 7/1982 | Tamura | 358/10 |

Primary Examiner—John C. Martin
Assistant Examiner—Michael D. Parker
Attorney, Agent, or Firm—David A. Jackson; Daniel H. Bobis

[57] ABSTRACT

Apparatus for synchronizing a first video signal corresponding to a first image and a second video signal corresponding to a second image, each of the first and second video signals including vertical and horizontal synchronizing signals, including a video camera which produces the first and second video signals and which generates vertical synchronizing signals for the first and second video signals in response to a negative-going edge of a pulse signal supplied thereto; a storage device which stores the first video signal produced by the video camera; a synchronizing signal generator which supplies vertical and horizontal synchronizing signals synchronized with the corresponding signals of the first video signal when the video camera is viewing the second image; and a monostable multivibrator connected between the vertical synchronizing signal terminals of the synchronizing signal generator and the video camera, and operative during viewing of the second image to produce and supply said negative-going edge of said pulse signal to the video camera in response to the trailing or positive-going edge of the vertical synchronizing signal from the synchronizing signal generator, the new negative-going edge being phase delayed from the positive-going edge of the vertical synchronizing signal which triggers the monostable multivibrator by slightly less than one field interval to control the camera to generate the vertical synchronizing signal for the second video signal in phase coincidence with the vertical synchronizing signal of the first video signal.

13 Claims, 6 Drawing Figures

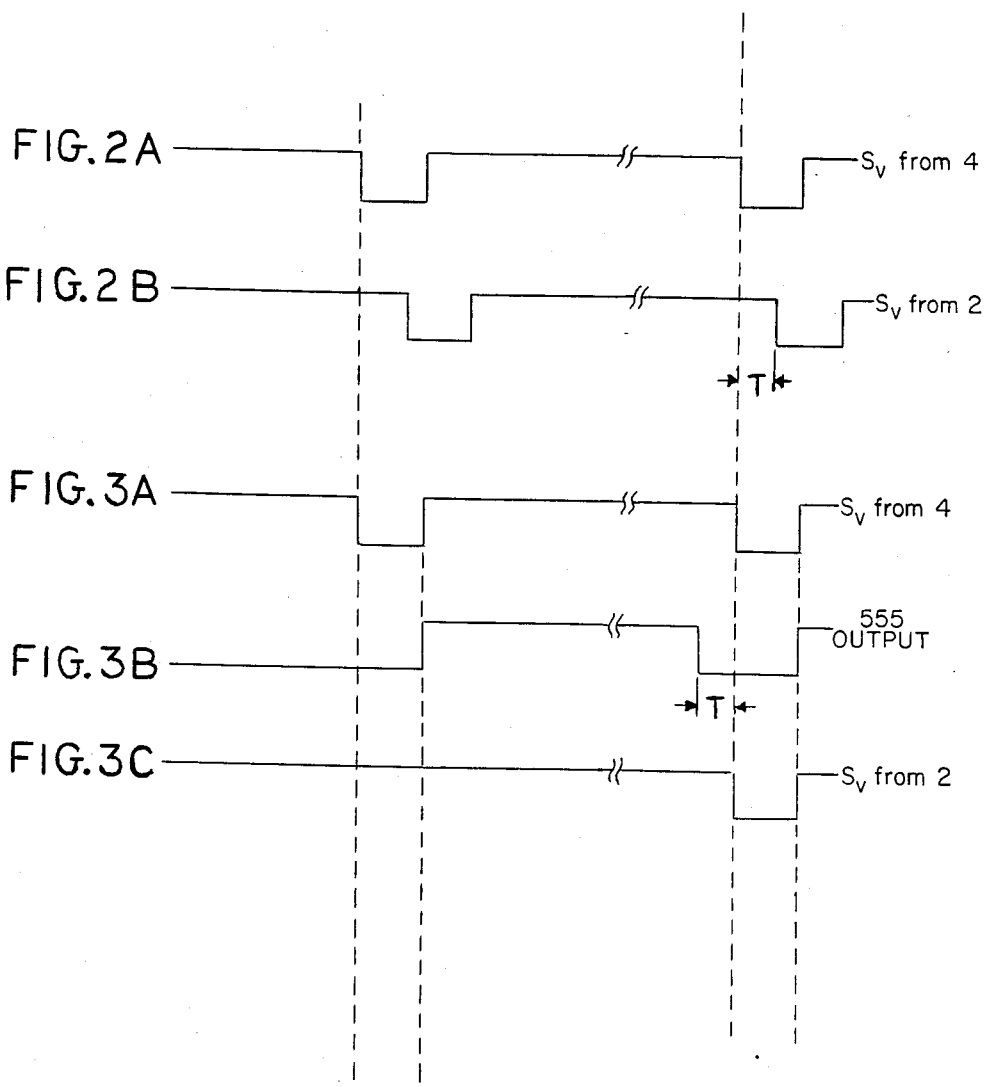

APPARATUS FOR SYNCHRONIZING TWO VIDEO PICTURES BY CONTROLLING VERTICAL SYNCHRONIZATION OF A VIDEO CAMERA

BACKGROUND OF THE INVENTION

1. Field of the Invention

This invention relates generally to the synchronization of a live picture with a recorded picture and, more particularly, is directed to the synchronization of a live picture with a recorded picture by generating a signal for controlling vertical synchronization of a video camera which views the live picture.

2. Description of the Prior Art

In many instances, for example, in television commercials and the like, it is desirable to successively view a first object followed by a second object having an identical configuration but with a different design thereon, so that only a change in the design is perceived by the viewer. As an example, it may be desirable to illustrate to a viewer ten different designs that are available on coffee cups. This can be accomplished by successively portraying each cup for approximately one or two seconds.

In order to focus the viewer's attention only on the change in design, when filming each cup, it is desirable that the cups be placed at the same position. In other words, if the cups are not exactly at the same position, during successive views of different cups, in addition to the design changing, the viewer will also perceive a shifting of each cup. Previously, it has been known to position the cups merely by sight or markings. It is to be appreciated that such positioning is inaccurate, and the viewer thereby still preceives the cups as shifting.

As another example, it may be desirable to provide a film clip in which an item appears out of thin air at a predetermined position. For example, after a person snaps his or her fingers, it may be desirable to place an object in the snapped fingers so that the viewer perceives the item appearing out of thin air into the fingers of that person. In this same regard, it is desirable to provide that the snapped fingers are in the same position before and after the item is placed therein so that no shifting is provided. However, as with the aforementioned "by sight" method, inaccuracies result and there is a shifting of the snapped fingers.

In order to overcome such problems, it has been proposed to utilize a video camera with the film camera. With such arrangement, the video camera produces a first composite video signal corresponding to a first object A, for example, a cup having a first design thereon, and supplies the first video signal to a storage device where it is recorded on, for example, a magnetic record medium. It is to be appreciated that the video camera is supplied with reference vertical and horizontal synchronizing signals from a synchronizing signal generator and, in response thereto, generates its own vertical and horizontal synchronizing signals as part of the first composite video signal in response to the leading edges of the referemce vertical and horizontal synchronizing signals supplied thereto. Because of delays in the video camera in generating the vertical and horizontal synchronizing signals, the latter signals generated by the video camera are delayed from the reference vertical and horizontal synchronizing signals supplied thereto from the synchronizing signal generator. The first composite video signal from the video camera corresponding to the first object A, which includes the vertical and horizontal synchronizing signals generated by the camera, is supplied to a storage device to be recorded on a magnetic record medium. Thereafter, object A, for example, a cup with a first design thereon, is replaced by an object B having a second design thereon. In order to make the objects coincident, object B is viewed by the video camera which, in turn, produces a second composite video signal which, along with the stored first composite video signal, is supplied to a monitor through a special effects generator. The two objects can then simultaneously be viewed on the monitor and object B can be moved accordingly.

Because of phase differences that may exist, the synchronizing signal generator which applies the vertical and horizontal synchronizing signals to the video camera is also supplied with the first composite video signal from the storage device and generates the reference vertical and horizontal synchronizing signals in phase alignment with the vertical and horizontal synchronizing signals of the first composite video signal from the storage device. However, because the video camera generates its own vertical and horizontal synchronizing signals which are delayed from the vertical and horizontal synchronizing signals from the synchronizing signal generator, the vertical and horizontal synchronizing signals for the second composite video signal corresponding to object B are delayed from the vertical and horizontal synchronizing signals of the first composite video signal corresponding to object A. As a result, even if object A and object B are perfectly coincident, when viewed on the monitor there will be an offset because of such delay. Therefore it becomes difficult, if not impossible, to provide coincidence between object A and object B.

Because the delay of the generated horizontal synchronizing signal by the video camera is of a relatively short duration, that is, a fraction of a horizontal scanning period, such delay can be compensated for by a delay circuit, for example, a delay circuit incorporated into the synchronizing signal generator. However, as to the delay of the vertical synchronizing signal generated by the video camera, it is to be appreciated that such delay may have a duration of a few horizontal scanning periods. However, to compensate for such delay, the vertical synchronizing signal from the synchronizing signal generator must be phase delayed for approximately one field interval less, of course, the few horizontal scanning periods of delay caused by the video camera. However, to delay the vertical synchronizing signal from the synchronizing signal generator by approximately one field interval is extremely complicated and expensive, if practically possible at all.

OBJECTS AND SUMMARY OF THE INVENTION

Accordingly, it is an object of this invention to provide an apparatus for synchronizing separate object images by generating a signal for controlling the vertical synchronization of a video camera.

It is another object of this invention to provide apparatus for synchronizing separate object images in an exact, easy and efficient manner.

In accordance with an aspect of this invention, apparatus for synchronizing a first video signal corresponding to a first image and a second video signal corresponding to a second image, each of the first and second video signals including at least a vertical synchronizing signal, includes camera means for producing the first and second video signals corresponding to the first and second images, respectively, the camera means including means for generating the vertical synchronizing signals of the first and second video signals in response to a pulse signal supplied thereto; storage means for storing the first video signal produced by the camera means; synchronizing signal generating means for producing a vertical synchronizing signal in response to the stored first video signal; and control means for generating said pulse signal phase displaced with respect to the vertical synchronizing signal of the first video signal in response to the vertical synchronizing signal from the synchronizing signal generating means, and for supplying the pulse signal to the camera means to control the latter to effect synchronization of the vertical synchronizing signals of the first and second video signals.

The above, and other, objects, features and advantages of the present invention will become readily apparent from the following detailed description thereof which is to be read in connection with the accompanying drawings.

BRIEF DESCRIPTION OF THE DRAWINGS

FIGS. 2A and 2B are timing diagrams used for explaining the problem solved by the present invention; and FIGS. 3A-3C are timing diagrams used for explaining the operation of the present invention.

DETAILED DESCRIPTION OF THE PREFERRED EMBODIMENTS

Figure 1:
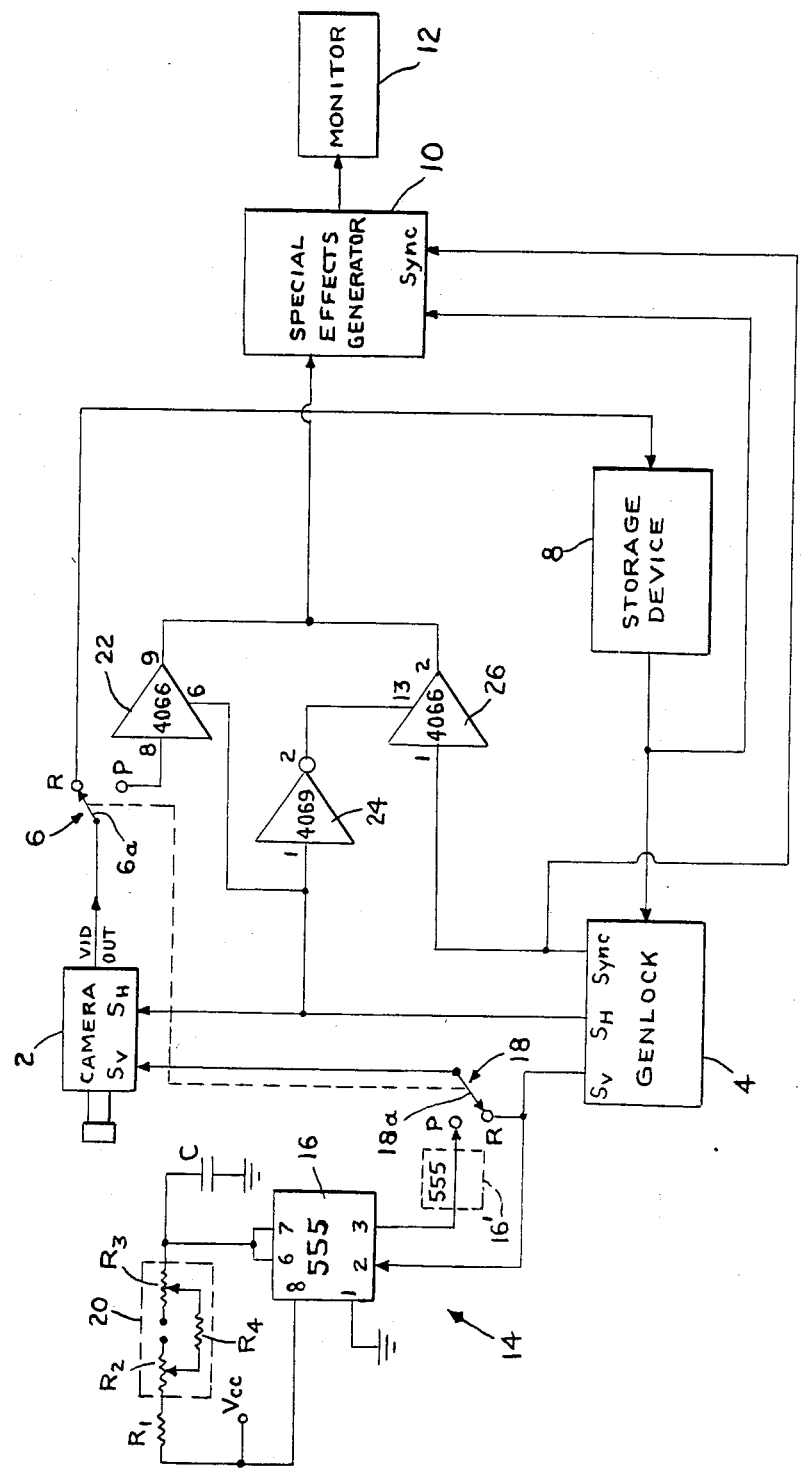
FIG. 1 is a block diagram of apparatus for synchronizing separate object images according to one embodiment of the present invention.

Referring to the drawings in detail, and initially to FIG. 1 thereof, apparatus for synchronizing separate object images according to one embodiment of the present invention includes a video camera 2 which generates composite video signals corresponding to object images viewed thereby. Video camera 2 may, for example, be a model AVC 3210 by SONY or a model PC2000 by RCA. The composite video signals generated by video camera 2 include vertical and horizontal synchronizing signals $S_V$ and $S_H$ which are also generated by video camera 2 in response to vertical and horizontal synchronizing signals supplied thereto from a synchronizing signal generator or genlock 4, which may be, for example, a Shintron model 312 Genlock Sync Generator. As previously discussed, the vertical and horizontal synchronizing signals $S_V$ and $S_H$ generated by video camera 2 are delayed from the vertical and horizontal synchronizing signals $S_V$ and $S_H$, respectively, supplied thereto from genlock 4 as a result of delays in generating the former signals by video camera 2. It is to be appreciated that, when a first object A is viewed by video camera 2, genlock 4 generates reference vertical and horizontal synchronizing signals $S_V$ and $S_H$, and accordingly, the vertical and horizontal synchronizing signals $S_V$ and $S_H$ which form part of the first composite video signal corresponding to object A are delayed from the vertical and horizontal synchronizing signals $S_V$ and $S_H$, respectively, supplied from genlock 4.

The first composite video signal is supplied at a video output VID OUT of camera 2 to a recording/playback (R/P) switch 6 having a movable arm 6a which is switchable between a recording terminal R and a playback terminal P. It is to be appreciated that, although switch 6 is illustrated as a single pole, double throw switch, switch 6 may be formed as a semiconductor device.

During viewing of the first object A, movable arm 6a of switch 6 is connected to recording terminal R thereof, such that the first composite video signal from video camera 2 is supplied to a storage device 8 which records the first composite video signal on a magnetic record medium. Storage device 8 may use a magnetic disc, magnetic tape or the like in which, for example, 10 seconds of video frame information is stored. For example, storage device 8 may use a magnetic disc which forms part of a combined monitor/storage device model SVM 1010 by SONY. A video cassette recorder which has dynamic tracking for still motion pictures may also be used. Alternatively, the storage device may be a memory, such as a random access memory (RAM).

As previously discussed, it may then be desirable to place a second object B, for example, a cup having a different design, in place of object A and at the same position. In this manner, the object B viewed by video camera 2 can be compared with object A, the composite video signal of which is stored in storage device 8.

More particularly, during such comparison, movable arm 6a of switch 6 is moved into contact with playback terminal P and the second composite video signal from video camera 2 corresponding to object B is supplied through switch 6 and playback terminal P to a special effects generator (SEG) 10, with the first composite video signal stored in storage device 8 supplied to another input of SEG 10. SEG 10 is also supplied at a SYNC input thereof with the combined vertical and horizontal synchronizing signals $S_V$ and $S_H$ from genlock 4. SEG 10 may be an SEG-1A Special Effects Generator made by SONY, which can function to fade one picture in while fading another picture out. The first and second composite video signals supplied to SEG 10 are thereby selectively supplied to a monitor 12 which may be any conventional cathode ray tube (CRT). Monitor 12 may form part of the aforementioned model SVM 1010 by SONY.

It is to be appreciated that, because of phase misalignment that may result between the vertical and horizontal synchronizing signals of the second composite video signal in respect to those of the first composite video signal, the stored first composite video signal is supplied to genlock 4 which supplies vertical and horizontal synchronizing signals $S_V$ and $S_H$ to video camera 2 which are synchronized (in phase) with the vertical and horizontal synchronizing signals of the first composite video signal stored in storage device 8. However, when the vertical and horizontal synchronizing signals $S_V$ and $S_H$ from genlock 4 are supplied to video camera 2 during viewing of the second object B, video camera 2 generates it own vertical and horizontal synchronizing signals $S_V$ and $S_H$ which are delayed from the corresponding vertical and horizontal synchronizing signals of the first composite video signal. As a result, even if object B is placed in the same position as object A, there will be an offset in the vertical and horizontal directions between the viewed pictures of object A and object B on monitor 12. It therefore becomes difficult to place object B at the same position of object A.

Since the horizontal delay or offset is only a fraction of a horizontal period, the horizontal offset can be easily corrected by suitable delay circuitry in genlock 4. However, with the vertical delay or offset, there is an offset of a few horizontal periods in the vertical direction, that is, a delay time period T as shown in FIGS. 2A and 2B. To correct this offset, a delay of approximately one field less the few horizontal periods must be provided. However, this delay is too great for conventional delay circuitry.

In accordance with an aspect of this invention, control means 14 is provided between genlock 4 and video camera 2 for generating a new negative-going edge (corresponding to the leading edge of a vertical synchronizing signal) which is supplied to the vertical synchronizing signal input of video camera 2, in response to the trailing or positive-going edge of the vertical synchronizing signal $S_V$ from genlock 4.

As shown in FIG. 1, control means 14 includes a monostable multivibrator or 555 timer 16 supplied with the vertical synchronizing signal $S_V$ from genlock 4. At the trailing or positive-going edge of the vertical synchronizing signal $S_V$ from genlock 4, monostable multivibrator 16 is triggered from a logic level "0" condition to a logic level "1" condition, as shown in FIG. 3B.

The output from monostable multivibrator 16 is supplied to a playback terminal P of a recording/playback (R/P) switch 18 having a movable arm 18a connected to the vertical synchronizing signal input of video camera 2, and movable between playback terminal P and a recording terminal R at the vertical synchronizing signal output of genlock 4. Switches 6 and 18 are ganged such that when movable arm 6a contacts recording terminal R, movable arm 18a contacts recording terminal R thereof, and when movable arm 6a contacts playback terminal P thereof, movable arm 18a contacts playback terminal P thereof. Further, as with switch 6, although switch 18 is shown as a single pole, double throw switch, switch 18 may be constructed as a semiconductor device.

During the time when video camera 2 views the second object B, switches 6 and 18 are in contact with playback terminals P thereof such that the output from monostable multivibrator 16 is supplied to the vertical synchronizing signal input of video camera 2, rather than being supplied with the vertical synchronizing signal from genlock 4.

Monostable multivibrator 16 is adjusted such that the negative-going or trailing edge of the output from monostable multivibrator 16 occurs at a time which is phase advanced from the next leading edge of the vertical synchronizing signal $S_V$ from genlock 4 by a time period T, as shown in FIGS. 3A and 3B, which is the same time period T that the vertical synchronizing signal $S_V$ generated by video camera 2 is delayed from the vertical synchronizing signal $S_V$ from genlock 4. The adjustment of monostable multivibrator 16 is accomplished by potentiometer circuitry 20 connected to monostable multivibrator 16, as shown in FIG. 1. As an example, resitors $R_1$-$R_4$ may have values of 7.5KΩ, 15KΩ, 2.5KΩ and 7.5KΩ, respectively, capacitor C may ahve a value of 0.47 μF and $V_{cc}$ may be equal to +12 V.

It is to be appreciated that the present invention does not follow a delay route to correct the vertical offset, but rather, uses a 555 timer supplied with the vertical synchronizing signal from genlock 4 and, in response thereto, generates a new negative-going edge which is supplied to trigger video camera 2.

In operation, the potentiometer setting for potentiometer circuitry 20 is adjusted as follows. First, a gridwork is viewed by camera 2 which produces a first composite video signal which is stored by storage device 8. At such time, movable arms 6a and 18a contact recording terminals R. Then, for the same gridwork at the same position, without making any changes in the object image gridwork, camera 2 again views this gridwork. However, during this second viewing, the first composite video signal stored in storage device 8 is applied to genlock 4 which, in turn, supplies a vertical synchronizing signal $S_V$ to control means 14. At such time, movable arms 6a and 18a contact playback terminals P. The control means 14 generates the signal shown in FIG. 3B which is supplied to video camera 2, and which, in turn, produces a second composite video signal. The second composite video signal and the first composite video signal stored in storage device 8 are then compared on monitor 12 through special effects generator 10, and potentiometer circuitry 20 is set so that the two gridwork pictures are made coincident. Thereafter, the apparatus can be utilized with any objects and the delay caused by video camera 2 is generating the vertical synchronizing signal $S_V$ thereby is compensated.

In addition, with such arrangement, there may be some problems with skewing of a few horizontal lines at the top of the screen or monitor 12, that is, uneven horizontal displacement of different lines at the top of the screen, and accordingly, suitable circuitry is provided between camera 2 and special effects generator 10, as shown in FIG. 1. More particularly, a 4066 gate or switch 22 is provided between playback terminal P of switch 6 and special effects generator 10 to selectively gate the output from video camera 2 to special effects generator 10. Gate 22 is controlled to an OFF condition by the horizontal synchronizing signal $S_H$ from genlock 4 which is also supplied to the horizontal synchronizing signal input of video camera 2. This same horizontal synchronizing signal $S_H$ is also supplied through a 4069 inverter 24 to the gate input of a 4066 gate or switch 26 which is supplied with the combined vertical and horizontal synchronizing signals from the SYNC input of genlock 4. The outputs of gates 22 and 26 are connected together to the respective input of special effects generator 10.

In operation, gate 22 substantially elimates the horizontal synchronizing signal $S_H$ from the second composite video signal supplied thereto from video camera 2, that is, gate 22 is controlled in an OFF condition substantially during the entire time period of the horizontal synchronizing signal of the second composite video signal from video camera 2. It is to be appreciated that the phase difference between the horizontal synchronizing signals $S_H$ from genlock 4 and video camera 2 is extremely small such that, although the entire horizontal synchronizing signal $S_H$ from video camera 2 is not entirely eliminated, most of the latter horizontal synchronizing signal $S_H$ is eliminated. The horizontal synchronizing signal $S_H$ supplied to gate 26 is gated by the output from inverter 24 to insert the horizontal synchronizing signal $S_H$ from genlock 4 at the correct time. With such arraangement, skewing of the picture at the top of the screen is substantially eliminated.

Alternatively, inverter 24 and gate 26 may be eliminated. In such case, the second composite video signal less the horizontal synchronizing signal $S_H$ thereof is supplied to SEG 10 from gate 22, and SEG 10 itself inserts the horizontal synchronizing signal $S_H$ supplied to its SYNC input from genlock 4 into the second composite video signal.

It is to be appreciated that still other modifications can be made with the present invention. For example, a second 555 timer 16' can be added between 555 timer 16 and switch 18, so that it is triggered on the negative-going edge of the output of 555 timer 16. With such arrangement, the negative-going edge of the signal supplied to video camera 2 is better defined.

Having described specific preferrred embodiments of the invention with reference to the accompanying drawings, it is to be understood that the present invention is not limited to those precise embodiments, and that various changes and modifications may be effected therein by one of ordinary skill in the art within the spirit and scope of the present invention as defined by the appended claims.

What is claimed is:

1. Apparatus for synchronizing a first video signal corresponding to a first image and a second video signal corresponding to a second image, each of said first and second video signals including at least a vertical synchronizing signal, comprising:
   camera means for producing said first and second video signals corresponding to said first and second images, respectively, said camera means including means for generating said vertical synchronizing signals of said first and second video signals in response to a pulse signal supplied thereto;
   storage means for storing said first video signal produced by said camera means;
   synchronizing signal generating means for producing a vertical synchronizing signal in response to said stored first video signal; and
   control means for generating said pulse signal phase displaced with respect to said vertical synchronizing signal of said first video signal in response to said vertical synchronizing signal from said synchronizing signal generating means, and for supplying said pulse signal to said camera means to control the latter to effect synchronization of said vertical synchronizing signals of said first and second video signals.

2. Apparatus according to claim 1; in which said control means includes monostable multivibrator means for producing said pulse signal in response to said vertical synchronizing signal from said synchronizing signal generating means.

3. Apparatus according to claim 2; in which said monostable multivibrator means is supplied with a vertical synchronizing signal from the synchronizing signal generating means and is triggered to produce said pulse signal in response to the positive-going edge of said vertical synchronizing signal from said synchronizing signal generating means.

4. Apparatus according to claim 2; in which said control means further includes adjustment means for controlling the duration of said pulse signal from said monostable multivibrator means.

5. Apparatus according to claim 2; further comprising switch means for selectively supplying one of said pulse signal from said control means and said vertical synchronizing signal from said synchronizing signal generating means to said camera means.

6. Apparatus according to claim 1; in which said control means includes first monostable multivibrator means for producing a first signal in response to said vertical synchronizing signal from said synchronizing signal generating means, and second monostable multivibrator means for producing said pulse signal in response to said first signal from said first monostable multivibrator means.

7. Apparatus according to claim 1; further comprising means for monitoring at least one of said first image and said second image in response to at least one of said first video signal and said second video signal, respectively.

8. Apparatus according to claim 7; further comprising special effects generator means for selectively supplying said first video signal and said second video signal to said monitor means and for controlling display of said first and second images by said monitor means.

9. Apparatus according to claim 1; in which said first and second video signals each include a horizontal synchronizing signal, and further comprising means for substantially eliminating the horizontal synchronizing signal from said second video signal and means for adding the horizontal synchronizing signal to said first video signal to said second video signal.

10. Apparatus according to claim 9; in which said means for substantially eliminating includes first gate means for transmitting said second video signal in response to the horizontal synchronizing signal of said first video signal.

11. Apparatus according to claim 10; in which said first gate means includes an output and said means for adding includes second gate means having an output connected to the output of said first gate means for gating said horizontal synchronizing signal of said first video signal.

12. Apparatus according to claim 9; in which said means for adding includes special effects generator means supplied with said first and second video signals and a horizontal synchronizing signal from said synchronizing signal generating means for adding the horizontal synchronizing signal from said synchronizing signal generating means to said second video signal.

13. Apparatus for synchronizing a first video signal corresponding to a first image and a second video signal corresponding to a second image, each of said first and second video signal including at least a vertical synchronizing signal, comprising:
   camera means for producing said first and second video signals corresponding to said first and second images, respectively, said camera means including means for generating said vertical synchronizing signals of said first and second video signals in response to a negative-going edge of a pulse signal supplied thereto;
   storage means for storing said first video signal produced by said camera means;
   synchronizing signal generating means for producing a vertical synchronizing signal in response to said stored first video signal; and
   control means for generating said negative-going edge of said pulse signal phase displaced with respect to the negative-going edge of said vertical synchronizing signal of said first video signal in response to said vertical synchronizing signal from said synchronizing signal generating means, and for supplying said pulse signal to said camera means to control the latter to effect synchronization of said vertical synchronizing signals of said first and second video signals.

* * * * *